United States Patent
Dudden

[11] 3,995,134
[45] Nov. 30, 1976

[54] APPARATUS FOR ELECTRIC DISCHARGE MACHINING OF HOLES

[75] Inventor: Derrick Esmond Dudden, Patchway, England

[73] Assignee: Rolls-Royce (1971) Limited, London, England

[22] Filed: Jan. 30, 1975

[21] Appl. No.: 545,557

[30] Foreign Application Priority Data

Jan. 30, 1974 United Kingdom.................. 4333/74

[52] U.S. Cl............................................. 219/69 E
[51] Int. Cl.²............................................ B23P 1/08
[58] Field of Search ............ 219/69 E, 69 M, 69 V, 219/69 R, 69 W, 131 F

[56] References Cited
UNITED STATES PATENTS

| | | |
|---|---|---|
| 2,942,092 | 6/1960 | Cammann.......................... 219/69 V |
| 3,056,014 | 9/1962 | Hulley et al......................... 219/69 E |
| 3,402,279 | 9/1968 | Sazhin................................ 219/69 M |
| 3,517,153 | 6/1970 | Check ................................ 219/69 E |

*Primary Examiner*—Bruce A. Reynolds
*Attorney, Agent, or Firm*—Stevens, Davis, Miller & Mosher

[57] ABSTRACT

An apparatus principally for producing holes in the wall of a passage in a workpiece, the apparatus has a curved tube insertable into the passage and an elongate flexible electrode is fed into the tube and deflected thereby to produce the desired holes, the apparatus is preferably for use with electrical discharge machining power supplies.

8 Claims, 5 Drawing Figures

APPARATUS FOR ELECTRIC DISCHARGE MACHINING OF HOLES

This invention relates to an apparatus for producing holes by electrical methods and is particularly applicable to drilling transverse holes between two longitudinal passages.

According to the present invention there is provided an apparatus capable of producing holes in a workpiece by electrical methods comprising an elongate relatively flexible electrode, means adapted to feed the electrode in a first direction and a guide for changing the direction of feeding of the electrode by deflecting it thereby enabling the electrode to produce a hole in a second direction different from the first direction.

In one embodiment of the invention the electrode comprises a hard drawn copper wire and the guide means comprises a stainless steel tube having a smooth curve at one end thereof.

The invention is particularly adapted to producing transverse holes between two longitudinal passages. Such transverse holes may, for example be necessary between longitudinal cooling passages in a turbine rotor blade.

In an embodiment adapted for producing transverse holes between two longitudinal cooling passages in a turbine rotor blade the electrode guide tube is insulated and is provided with a location means for maintaining the tube in a desired position in one of said longitudinal passages.

Preferably the apparatus is used with electric discharge machining apparatus.

For use in producing transverse holes between longitudinal cooling passages in turbine rotor blades; a probe may be provided for detecting when the electrode has broken through from the first longitudinal passage into the second longitudinal passage.

The probe may comprise a rod of tungsten carbide insertable in said second longitudinal hole and forming part of an electric circuit for determining when contact is made between the electrode and the rod.

Means may also be provided for indexing the guide tube along the first longitudinal hole for drilling a plurality of spaced transverse holes.

With a tungsten carbide rod for use as a probe an additional benefit is derived when producing a plurality of spaced transverse holes inasmuch as the electrode may become tapered in use and its electrical contact with the tungsten carbide will reduce the tapered portion, thereby enabling greater reproducibility of transverse hole dimensions.

An embodiment of the present invention will now be described by way of example only and with reference to the accompanying drawings wherein.

Figure 1:
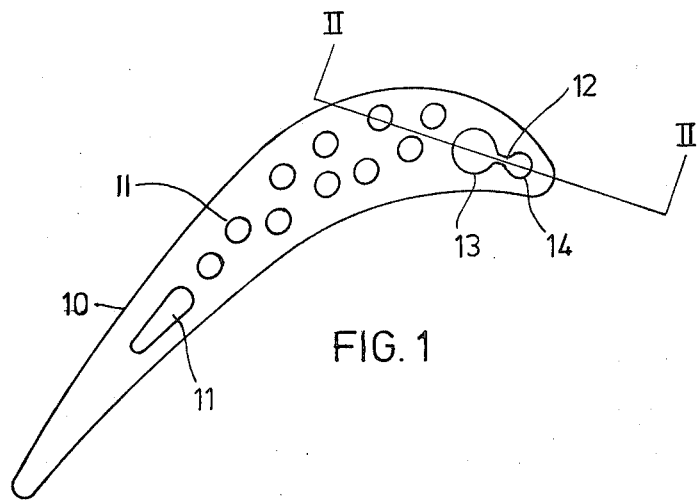
FIG. 1 is a transverse section through a gas turbine rotor blade.

Referring now to FIG. 1 in which there is shown a transverse section through a workpiece which is a gas turbine rotor blade 10. Several longitudinal passages 11 are cast in the blade for cooling the blade during its operation in a gas turbine engine.

It is frequently desirable to produce transverse holes between these longitudinal passages and one such transverse hole 12 may be seen connecting longitudinal passages 13 and 14. It will be appreciated that it is a considerable problem to produce such transverse holes and it will be understood that the problem is made more severe by the generally small size of the longitudinal passages 13, 14 which may be typically 0.060 and 0.040 inch in diameter respectively. The transverse hole corresponding to these longitudinal passage sizes would typically be 0.008 to 0.010 inch and 40 off would be required at a pitch of 0.020 inch.

Figure 2:
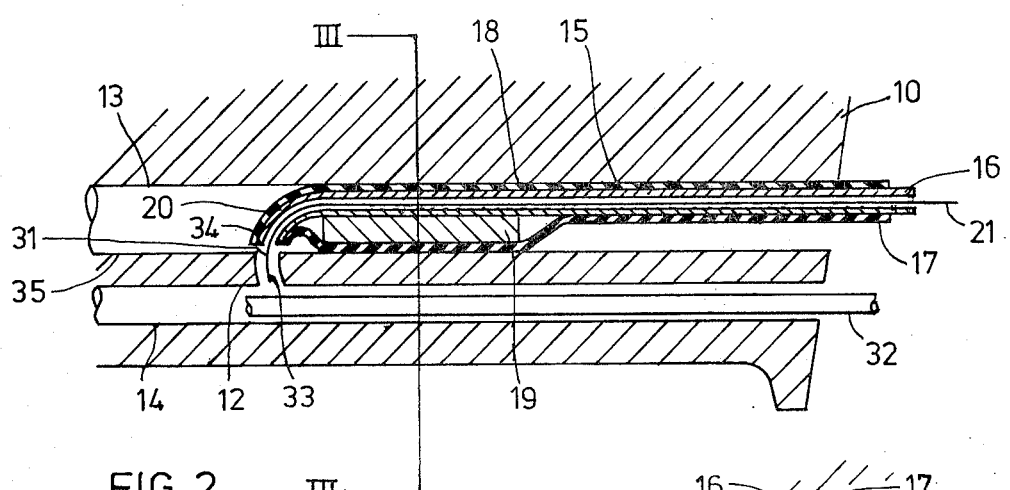
FIG. 2 is a section on the line II—II of the rotor blade of FIG. 1 showing an apparatus according to the present invention for producing a transverse hole between two longitudinal cooling passages in the blade.
Figure 3:
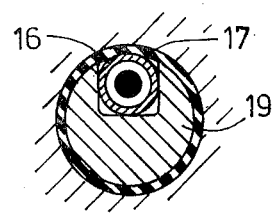
FIG. 3 is a section on the line III—III of FIG. 2.

Referring now also to FIGS. 2 and 3 an apparatus 15 can be seen which comprises a stainless steel tube 16 covered by insulation 17 and located against one side 18 of the passage 13 in the gas turbine rotor blade by a spacer 19. At one end 20 the tube 16 has been bent to provide a smooth radius of as large a size as the passage 13 will permit. The smooth radius may be produced using any suitable conventional method of bending.

An electrode 21 is fed through the tube 16 in a first direction parallel to the axis of the tube until it encounters the bent end of the tube which turns the electrode into a second different direction whereby it can produce the transverse hole 12. The electrode in this embodiment consists of a length of 36 S.W.G. half hard tempered copper wire and is maintained at a sufficiently high potential to allow electric discharge machining of the hole 12.

Figure 4:
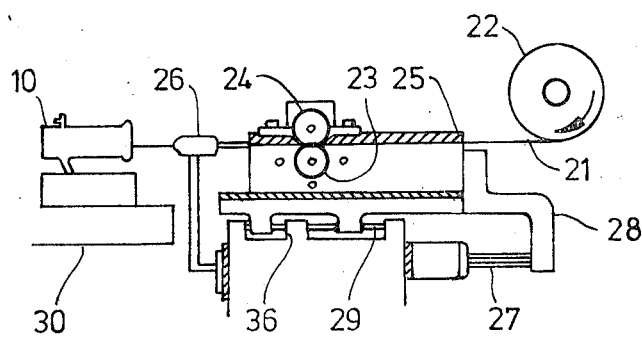
FIG. 4 is a section through an apparatus for electrical discharge machining in accordance with the present invention.

During this electric discharge machining the electrode wears and it is necessary to continuously feed the electrode towards the workpiece in order to maintain the electrode in working relationship with the workpiece. The apparatus of FIG. 4 is provided for controlling the feed of the electrode. The electrode in wire form 21 is wound on a spool 22 from which it is drawn by a pair of co-operating rollers 23, 24 via a groove formed in a cover plate 25 made of fibre-reinforced resin. This both eliminates kinks in the electrode wire and also work hardens it by the act of drawing. From the rollers the wire passes through a guide 26 into the stainless steel tube 16. The roller 23 is of steel, knurled to provide adequate friction, and serves to electrically connect the electrode to the power source (not shown) for the electric discharge machining operation. The power source is of a kind well known per se and does not form part of the present invention.

The upper roller 24 is of rubber and is set so as to engage the steel roller sufficiently hard just to allow smooth wire feed with no slippage. The roller feed system is used only for initial adjustment of the electrode position and prior to the production of each hole to compensate for wear in the electrode. Contact between the electrode and the work is sensed electrically and the electrode is then retracted by 0.010 inch. Thus it will be appreciated that the backlash in the roller drive system needs to be carefully controlled. The actual feed of the electrode into the workpiece during the drilling operation is controlled by a hydraulic piston 27 which traverses the entire roller carriage 28 along relatively fixed guide rails 29. The roller carriage and the guide 26 are insulated from the relatively fixed base 36 of the apparatus of FIG. 4. The position of the hydraulic piston 27 is controlled by the electrical discharge machining control system which is responsive to the potential difference between the electrode and the workpiece through a feedback system to control the supply of pressurized fluid to the hydraulic piston. Superimposed on the control signal to the pressurized fluid supply is a vibratory perturbation which via the roller carriage 27 vibrates the electrode in well known fashion for improving the stability of the drilling process.

The workpiece 10 is itself mounted on a table 30 which may be indexed along to relatively spaced successive holes 12. It will be appreciated that during the drilling of each hole the distance between the roller carriage 28 and the fixed guide 26 is changing. In certain circumstances it has been found that the lengths of electrode wire between the rollers 23,24 and the fixed guide 26 is sufficiently large relative to the stiffness of the electrode wire that there is a tendency for the electrode wire to kink. This can be avoided by the arrangement shown in FIG. 5.

Figure 5:
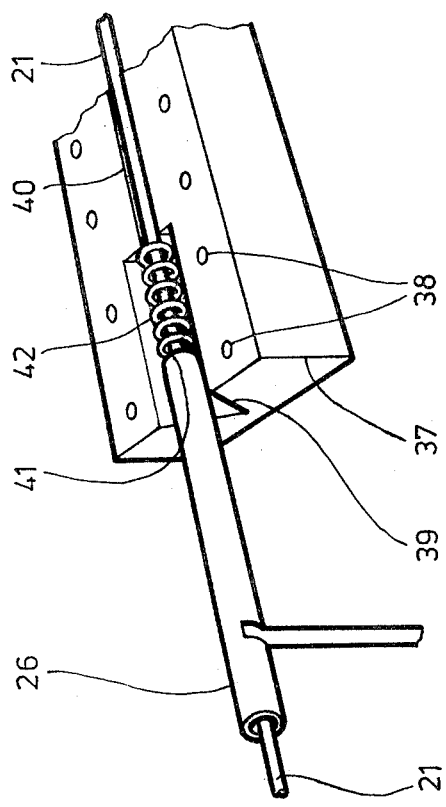
FIG. 5 is a detail of the apparatus of FIG. 4.

In FIG. 5 a perspective view of the forward end 37 of the roller carriage 28 is shown with the cover plate 25 removed. The cover plate is attached by set bolts engaging the screw threaded holes 38. In the forward end 37 of the roller carriage 28 is provided two vee-shaped grooves 39,40, respectively. The vee-shaped groove 39 is relatively large and the rear end 41 of the fixed guide 26 is arranged to slide along this groove during relative motion between the guide 26 and the roller carriage 28. The vee-shaped groove 40 is rather smaller than the grove 39 and guides the electrode wire 21 as it is fed by the roller system. In the space between the rear end 41 of the guide tube and the smaller vee-shaped groove 40 is fitted a compression spring 42 which as substantially the same external diameter as the guide tube 26 and has an internal diameter slightly larger than the diameter of the electrode wire; in this way the compression spring prevents kinking of the electrode wire whilst permitting relative movement between the guide 26 and the roller carriage 28. The cover plate 25 is formed with corresponding grooves to those in the roller carriage so that the axes of the electrode wire and the guide tube 26 are concentric.

Prior to using the apparatus it is prudent to feed the electrode through the tube and to measure the radius of the bend 31 produced in the copper electrode. It will be appreciated that by varying the radius of this bend the general angular disposition of the hole 12 relative to the axis of the passage 13 may be varied. This may have particular advantages with respect to the cooling airflow through a gas turbine rotor blade for adjusting the pressure drop between the two passages 13 and 14.

As is usual in electric discharge machining the workpiece and apparatus are flooded with dielectric oil during the process, this may readily be achieved in the present embodiment by immersing the workpiece in the oil and ensuring flow through the blade cooling passages.

A probe 32 may be introduced into passage 14 for detecting when the electrode breaks through between the passages 13 and 14. The probe comprises a bar of tungsten carbide which is electrically conductive and can thus be used to electrically detect contact between itself and the electrode. The use of tungsten carbide has a further advantage inasmuch as contact with the electrode electrically, significantly wears the electrode to reduce the taper formed at its end 33 during the drilling process. Thus the electrode produces a plurality of successive holes having greater uniformity of dimensions. The probe also protects the side of the passage 14 from spark erosion by the electrode. At the end of the process for each blade the probe may be withdrawn and checked to ensure satisfactory production of each transverse hole 12 by way of correct positioning and penetration.

During the producing process the stainless steel tube 16 will assume a potential substantially the same as that of the electrode and there will therefore be substantially no tendency for discharge to occur between the electrode and the tube. The end 34 of the stainless tube is maintained by the spacer 19, sufficiently far away from the side 35 of the passage 13 to substantially prevent discharge therebetween.

The following parameters may be considered typical for producing transverse holes 12 between two longitudinally extending passages 13, 14 in a gas turbine rotor blade.

| | |
|---|---|
| Diameter of hole 13 | 0.060 inch |
| Diameter of hole 14 | 0.040 inch |
| Diameter of holes 12 | 0.0079 – 0.098 inch |
| Depth of holes 12 | 0.030 inch |
| Diameter of Cu wire | 0.0076 inch, 36 S.W.G. |
| O/D of Stainless Steel Tube | 0.022 inch 24 S.W.G. |
| I/D of Stainless Steel Tube | 0.012 inch |
| No. of holes | 40 |
| Pitch of holes | 0.020 inch |
| Blade Material | Cast Nickel Base Alloy |
| Potential Difference between electrode and blade | 120 volts |
| Machining current | 0.5 ampere |
| Radius of bend of electrode | 0.040 – 0.065 inch |
| Machining dielectric | Silicon -based oil diluted with kerosene |
| Drilling rate | 10 secs. per hole |

Plus a small degree of induced longitudinal electrode vibration of the order of 0.002 inch amplitude.

It will be appreciated that the invention may be used for many other hole producing operations wherein it is necessary for the feed direction of the electrode to differ from the direction of the hole. In particular it may be desirable to produce radial holes outwardly from a longitudinal bore and such holes may be produced for example to lie along a helical path.

The invention is not restricted to electrical discharge machining and may for example be applied to electro-chemical machining wherein the dielectric is replaced by an eletrolyte and the voltages applied to the electrode are different from those employed in the embodiment described above.

I claim:

1. In combination with a workpiece having a longitudinal passage extending in a first direction therein, apparatus for producing a hole in said workpiece extending from said passage in a second direction different from said first direction comprising a guide for insertion in said passage, the inserted end of said guide being curved smoothly toward said second direction; an elongate relatively flexible electrode for insertion within said guide; means for feeding said electrode into said guide so that an end thereof is caused by said guide to move in said second direction; and means for applying a potential difference between said electrode and said workpiece; a hole being produced in said workpiece by said energized electrode which extends from said passage in said second direction.

2. Apparatus as defined by claim 1, wherein said guide is a tube formed of an electrically conductive material, and wherein said apparatus further comprises insulating means interposed between said tube and said workpiece.

3. Apparatus as defined by claim 2, which further comprises a spacer positioned between said tube and insulating means for maintaining said tube in a desired working relationship within said passage.

4. Apparatus as defined by claim 1, which further comprises a spacer positioned between said guide and the wall of said passage for maintaining said guide in a desired working relationship within said passage.

5. Apparatus as defined by claim 4, which further comprises a probe positioned with respect to said workpiece for detecting when said electrode has completed said hole, a visible indication being provided on said probe when said hole is completed.

6. Apparatus as defined by claim 5, wherein said workpiece has a second longitudinal passage and said hole extends between said first and second passages, the completion of said hole being detected by said probe being positioned within said second passage.

7. Apparatus as defined by claim 5, wherein said probe comprises a rod of tungsten carbide.

8. Apparatus as defined by claim 1, wherein said means for feeding said elongate electrode includes a compression spring, said spring supporting said electrode to allow relative movement between said feed means and said guide and to prevent kinking of said electrode.

* * * * *